Patented Jan. 4, 1927.

1,613,275

UNITED STATES PATENT OFFICE.

RICHARD HERZ, OF FRANKFORT-ON-THE-MAIN, AND JENS MÜLLER, OF HANAU-ON-THE-MAIN, GERMANY, ASSIGNORS TO GRASSELLI DYESTUFF CORPORATION, OF NEW YORK, N. Y., A CORPORATION OF DELAWARE.

VAT DYESTUFFS OF THE 2-THIONAPHTHENE-2-INDOLINDIGO SERIES.

No Drawing. Application filed March 23, 1926, Serial No. 96,864, and in Germany October 25, 1924.

Our invention has for its object new and valuable dyestuffs of the 2-thionaphthene-2-indolindigo series, having probably the general formula:

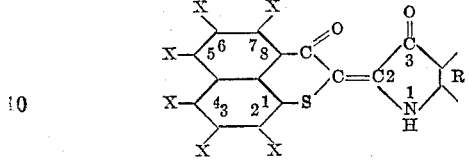

wherein the X's stand for hydrogen atoms, of which one or more may be replaced by a monovalent substituent. R means an arylresidue of the benzene or naphthalene series, which may contain further substituents, which dyestuffs dye cotton and wool from the hydrosulfite vat fast blue to green shades.

According to our invention perinaphthoxypenthiophenes of the general formula:

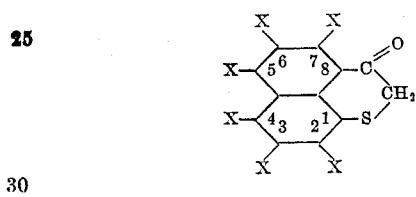

wherein the X's stand for hydrogen atoms, of which one or more may be replaced by a monovalent substituent, are condensed with an α-isatin compound of the general formula:

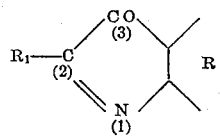

wherein R is an arylresidue of the benzene or naphthalene series, which may contain further substituents, $R_1$ a halogen or an arylidogroup.

The dyestuffs, thus obtained, may be further halogenized by treating them with halogenizing agents in the usual manner in suitable solvents or diluents.

Besides the perinaphthoxypenthiophene itself derivatives therefrom, containing substituents in the naphthalene nucleus, may be used for instance 2- or 5-chloroperinaphthoxypenthiophene, 2-amino- or 2-acylamino- or 2-acylamino-6-bromo-perinaphthoxypenthiophene or 4-acetylaminoperinaphthoxypenthiophene. Dyestuffs, containing the acylaminogroup in 2-position, that is in ortho-position to the S-atom of the side chain, generally dye blue shades, but if the acylgroup is split off by saponification, the shade turns generally to green.

Whereas the symmetrical thioindigo-dyestuffs, derived from perinaphthoxypenthiophene and its derivatives, possess insufficient affinity to the fibre, the dyestuffs produced according to our invention are distinguished by their good affinity to the vegetable and animal fibre and by their excellent fastness to light.

The materials, dyed with the new dyestuffs, also form a part of our invention.

The following examples illustrate our invention, the parts being by weight and all temperatures in centigrade degrees.

Example 1.

6.5 parts of 4.7-dichloroisatin are suspended in about 150 parts of chlorobenzene and converted into the 4.7-dichloro-α-isatinchloride by treating it in the usual manner with 6.5 parts of phosphorous pentachloride.

The solution, thus obtained, is mixed at an ordinary temperature with a solution of 6 parts of perinaphthoxypenthiophene in about the tenfold quantity of chlorobenzene. The formation of the dyestuff begins already in the cold and is accelerated by warming on the water-bath. After termination of the reaction the formed dyestuff is filtered, washed and dried.

The dyestuff, having probably the formula:

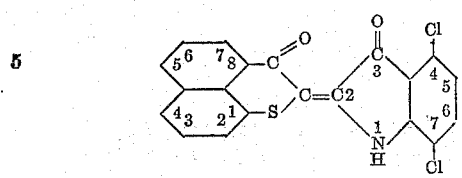

is, when dry, a dark blue powder, soluble in concentrated sulfuric acid to a blue solution. It forms with alkaline hydrosulfite a brownish colored vat and dyes cotton and wool full blue shades. The dyeings are distinguished by a very good fastness to washing, milling, light and chlorine.

The reactions described above can be represented by the following formulæ:

(1) Formation of the 4-7-dichloro-alpha-isatine chloride

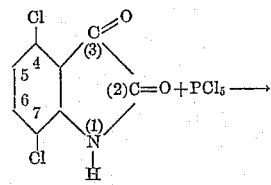

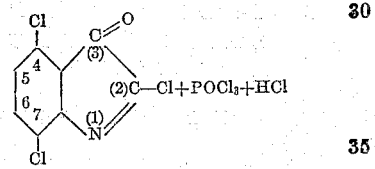

(2) Condensation and formation of the dyestuff

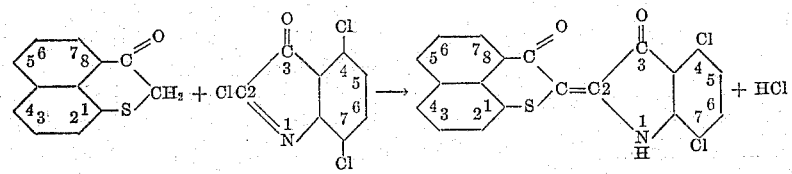

Similar blue dyeing dyestuffs are formed by substituting the 4.7-dichloroisatinchloride by 4:6- and 5.7-dichloro- or 4.5.6-trichloroisatinchloride or by 4-chloro-7-methoxy-isatinchloride or by 5-chloro-7-methylisatin-chloride.

Instead of the α-chloride the α-arylides of these isatinbodies may be used, yielding the same good result.

Example 2.

39 parts of 1-chloro-2-3-naphthisatin-α-(1-chloro-2)-naphthalide, produced according to U. S. A. Letters Patent No. 1,083,518, are mixed with about 600 parts of acetic acid anhydride or glacial acetic acid, then 20 parts of perinaphthoxypenthiophene are added, and the mixture is heated to boiling for a short while.

The formed dyestuff is filtered, when cold, washed and dried. The dyestuff, having probably the formula:

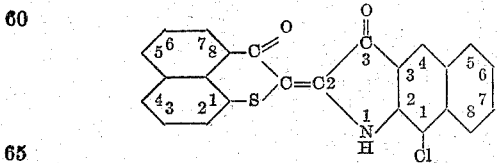

is, when dry, a dark powder, dissolving in concentrated sulfuric acid with a grey-green color, and dyes cotton and wool in the hydrosulfite vat fast pure bluish green shades.

By substituting the 1-chloro-2.3-naphthisatin-α-(1-chloro-2)-napthalide by the equivalent quantity of bromo-1-chloro-2.3-naphthisatin-α-(1-chloro-2)-naphthalide, produced according to U. S. A. Letters Patent No. 1,083,518, a yellow-green dyeing dyestuff is obtained.

Also in this case instead of the α-naphthalides the corresponding α-chlorides of the halogenized 2.3-naphthisatin may be used.

Example 3.

42 parts of 4.5.6-trichloroisatin are suspended in about 600 parts of benzene and converted in the corresponding α-isatinchloride by warming it with 40.5 parts of phosphorous pentachloride in the known manner.

This solution is mixed with a solution of 43 parts of 2-acetylaminoperinaphthoxypenthiophene in about the tenfold quantity of nitrobenzene and warmed to about 50° C. The solution turns green and the dyestuff begins to separate. After a short while the separated dyestuff is filtered, washed and dried.

The dyestuff, having probably the formula:

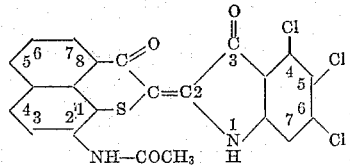

is when dry a blue powder, soluble in concentrated sulfuric acid to a blue solution, and dyes cotton and wool in an orange colored hydrosulfite vat dark blue shades.

In order to split off the acetylgroup, 5 parts of the dyestuff are dissolved in about 150-200 parts of concentrated sulfuric acid, then ice is added, until a sulfuric acid of 50% strength is formed, and the mixture is boiled under reflux for some time. After cooling down the mass is diluted with water, the separated dyestuff is filtered, washed and dried.

The saponified dyestuff, having probably the formula:

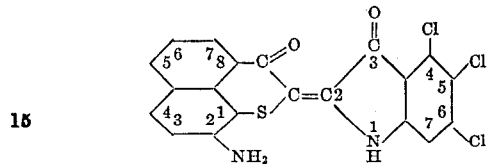

dyes cotton and wool in the hydrosulfite vat fast pure green shades.

Similar dyestuffs are obtained by substituting the trichloroisatinchloride by the α-chlorides or α-arylides of 5.7- or 4.7-dichloroisatin or of 4-chloro-7-methoxy-isatin.

*Example 4.*

39 parts of 1-chloro-2.3-naphthisatin-α-(1-chloro-2)-naphthalide are mixed with about the twentyfold quantity of glacial acetic acid, then 26 parts of 2-acetylaminoperinaphthoxypenthiophene are added, the mixture is warmed slowly and finally boiled for some hours while stirring.

The solution turns at first green, then brownish red, while the product of condensation separates. It is filtered in the warm, washed and dried.

The dyestuff, having probably the formula:

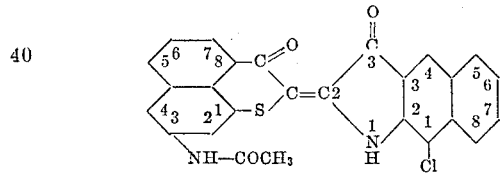

is, when dry, a dark green powder soluble in concentrated sulfuric acid to an olive-green solution. It forms with an alkaline hydrosulfite solution a red colored vat and dyes cotton and wool from such a vat pure fast yellowish green shades.

Instead of the 1-chloro-2.3-naphthisatin-α-(1-chloro-2)-naphthalide the 1-chloro-2.3-naphthisatin-α-chloride may be used with the same result.

A similar dyestuff is obtained in the same manner, if 2-acetyl-aminoperinaphthoxypenthiophene is substituted by 2-benzolyaminoperinaphthoxypenthiophene.

By using the corresponding bromo-1-chloro-2.3-naphthisatin bodies, a more yellowish dyeing dyestuff is obtained.

By condensing 6-bromo-2-acetylaminoperinaphthoxypenthiophene or 7-methoxy-2-acetylaminoperinaphthoxypenthiophene with a 1-chloro-2.3-naphthisatin compound, also green dyeing dyestuffs are formed, by using 4-acetylaminoperinaphthoxypenthiophene for the condensation, a dark blue dyeing dyestuff is obtained. When in the latter dyestuff the acetylgroup is split off by saponification, fuller blue shades are obtained.

The term "penthiophene" for the purpose of the present invention, and as used in the appended claims, is intended to define a body having the ring structure indicated by the formula

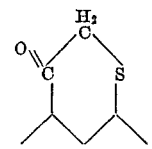

said term having been coined by Friedlaender (Liebig's "Annalen der Chemie", vol. 388, page 12) to designate a six-membered ring containing 5 carbon atoms and a sulfur atom.

Having now particularly described and ascertained the nature of our said invention, and in what manner the same is to be performed, we declare that what we claim is:

1. As new products vat dystuffs of the 2-thionaphthene-2-indolindigo- series, having probably the general formula:

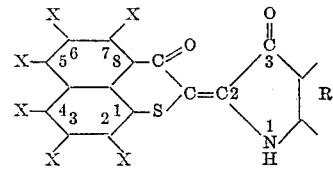

wherein the X's stand for hydrogen atoms, of which one or more may be replaced by a monovalent substituent, and R means an arylresidue of the benzene or naphthalene series, which may contain further substituents, which dyestuffs are when dry dark blue to green powders, soluble in concentrated sulfuric acid to an olive, green to blue solution, and dye cotton and wool in a yellow, red to brown vat fast blue to green shades, which dyestuffs may be obtained by condensing perinaphthoxypenthiophenes of the general formula:

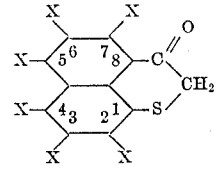

wherein the X's stand for hydrogen atoms, of which one or more may be replaced by a monovalent substituent, with α-isatin compounds of the general formula:

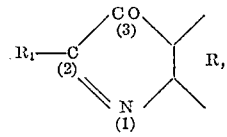

wherein R is an arylresidue of the benzene or naphthalene series, which may contain further substituents, $R_1$ a halogen or an arylidogroup.

2. As new products vat dyestuffs of the 2-thionaphthene-2-indolindigo series, having probably the general formula:

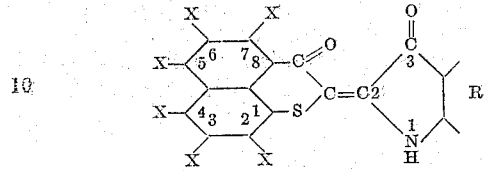

wherein the X's stand for hydrogen atoms, of which one or more may be replaced by a monovalent substituent, and R means a halogenized arylresidue of the benzene or naphthalene series, which may contain further substituents, which dyestuffs are when dry dark blue to green powders, soluble in concentrated sulfuric acid to an olive, green to blue solution, and dye cotton and wool in a yellow, red to brown vat fast blue to green shades, which dyestuffs may be obtained by condensing perinaphthoxypenthiophenes of the general formula:

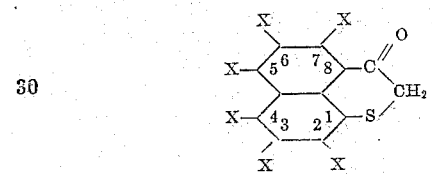

wherein the X's stand for hydrogen atoms, of which one or more may be replaced by a monovalent substituent, with α-isatin compounds of the general formula:

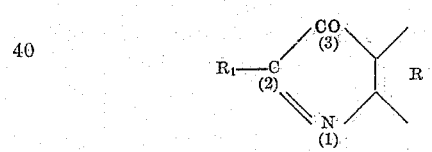

wherein R is a halogenized arylresidue of the benzene or naphthalene series, which may contain further substituents, $R_1$ a halogen or an arylidogroup.

3. As new products vat dyestuffs of the 2-thionaphthene-2-indolindigo series, having probably the general formula:

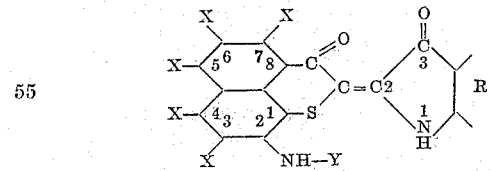

wherein the X's stand for hydrogen atoms, of which one or more may be replaced by a monovalent substituent, Y means hydrogen, which may be substituted by an acylgroup, R a halogenized arylresidue of the benzene or naphthalene series, which may contain further substituents, which dyestuffs are, when dry, dark blue to green powders, soluble in concentrated sulfuric acid to an olive, green to blue solution, and dye cotton and wool in a yellow, red to brown vat fast blue to green shades, which dyestuffs may be obtained by condensing perinaphthoxypenthiophenes of the general formula:

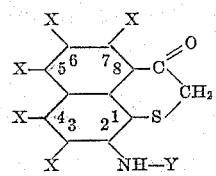

wherein the X's stand for hydrogen atoms, of which one or more may be replaced by a monovalent substituent, Y is hydrogen, which may be substituted by an acylgroup, with α-isatin compounds of the general formula:

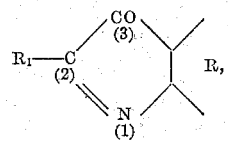

wherein R is a halogenized arylresidue of the benzene or naphthalene series, which may contain further substituents, $R_1$ a halogen or an arylidogroup.

4. As new products vat dyestuffs of the 2-thionaphthene-2-indolindigo series, having probably the general formula:

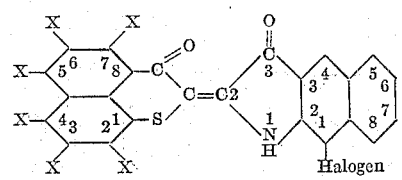

wherein the X's stand for hydrogen atoms, of which one or more may be replaced by a monovalent substituent, which dyestuffs are, when dry, dark blue to green powders, soluble in concentrated sulfuric acid to an olive, green to blue solution, and dye cotton and wool in a yellow, red to brown vat fast blue to green shades, which dyestuffs may be obtained by condensing perinaphthoxypenthiophenes of the general formula:

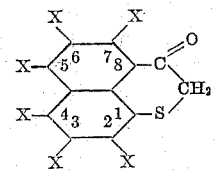

wherein the X's stand for hydrogen atoms, of which one or more may be replaced by a monovalent substituent, with α-1-acyl-2.3-naphthisatin compounds of the formula:

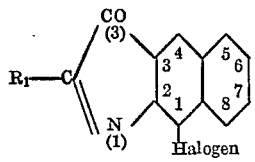

wherein $R_1$ is a halogen or an arylidogroup.

5. As new products vat dyestuffs of the 2-thionaphthene-2-indolindigo series, having probably the formula:

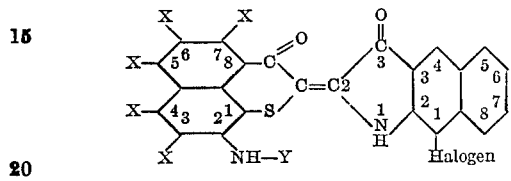

wherein the X's stand for hydrogen atoms, of which one or more may be replaced by a monovalent substituent, and Y means an acylgroup, which dyestuffs are, when dry, dark green powders, soluble in concentrated sulfuric acid to an olive-green solution, and dye cotton and wool in a red vat fast pure green shades, which dyestuffs may be obtained by condensing 2-acyl-aminoperinaphthoxypenthiophenes of the formula:

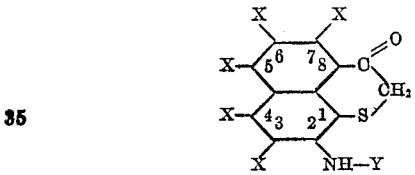

wherein the X's stand for hydrogen atoms, of which one or more may be replaced by a monovalent substituent and Y is an acylgroup, with an α-1-halogen-2.3-naphthisatin compound of the formula:

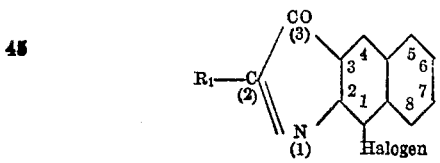

wherein $R_1$ is a halogen or an arylidogroup.

6. As new products vat dyestuffs of the 2-thionaphthene-2-indolindigo series, having probably the formula:

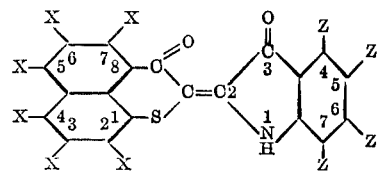

wherein the X's stand for hydrogen atoms, of which one or more may be replaced by a monovalent substituent, and the Z's stand for hydrogen or other monovalent substituents and of which two or more may be replaced by halogens, which dyestuffs are, when dry, dark blue powders, soluble in concentrated sulfuric acid to a blue solution, and dye cotton and wool in a brownish vat full blue shades, which dyestuffs may be obtained by condensing perinaphthoxypenthiophenes of the formula:

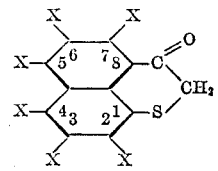

wherein the X's stand for hydrogen atoms, of which one or more may be replaced by a monovalent substituent, with an α-isatin compound of the formula:

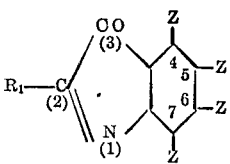

wherein the Z's stand for hydrogen or other monovalent substituents and of which two or more may be replaced by halogens, and $R_1$ is a halogen or an arylidogroup.

In testimony whereof, we affix our signatures.

RICHARD HERZ.
JENS MÜLLER.